United States Patent [19]
Persson

[11] Patent Number: 5,125,868
[45] Date of Patent: Jun. 30, 1992

[54] APPARATUS FOR ORIENTATION OF FISH WITH RESPECT TO THE POSITION OF ABDOMEN & DORSUM

[76] Inventor: Agne Persson, Kaivokatu 6 B, SF-21160 Naantali, Finland

[21] Appl. No.: 582,924
[22] PCT Filed: Apr. 12, 1989
[86] PCT No.: PCT/FI89/00069
§ 371 Date: Oct. 31, 1990
§ 102(e) Date: Oct. 31, 1990
[87] PCT Pub. No.: WO89/10061
PCT Pub. Date: Nov. 2, 1989

[30] Foreign Application Priority Data
Apr. 18, 1988 [DE] Fed. Rep. of Germany ..... 38128705

[51] Int. Cl.⁵ .............................................. A22C 25/08
[52] U.S. Cl. .................................... 452/179; 452/182
[58] Field of Search ............... 452/179, 177, 182, 183

[56] References Cited

U.S. PATENT DOCUMENTS

| | | | |
|---|---|---|---|
| 1,689,919 | 3/1927 | Heath | 452/179 |
| 3,514,811 | 6/1970 | West | 452/179 |
| 3,550,192 | 8/1970 | Ericksson | 452/179 |
| 3,561,041 | 2/1971 | Szymanski et al. | 452/179 |
| 4,601,083 | 7/1986 | Shoji | 452/64 |
| 4,651,385 | 3/1987 | Persson | 452/179 |

FOREIGN PATENT DOCUMENTS
1316624 6/1987 U.S.S.R. ...................... 452/179

OTHER PUBLICATIONS
Int'l Search Report filed with respect to WO-89/10061.

Primary Examiner—Willis Little
Attorney, Agent, or Firm—Ladas & Parry

[57] ABSTRACT

The present invention relates to an apparatus for the orientation of fish with respect to the position of abdomen and dorsum. The fishes (6, 7) are thrown head first against an oblique, preferably curved guide element (5) in such a way that the center of gravity of the head (8) of the fish lies sidewards from the perpendicular to the guide element (5) through the contact point of the fish, due to which the fish turns into contact with the guide element (5) and into the same orientation with respect to the direction of abdomen and dorsum, irrespective of, whether the fish hits the guide element with dorsum or with abdomen.

7 Claims, 2 Drawing Sheets

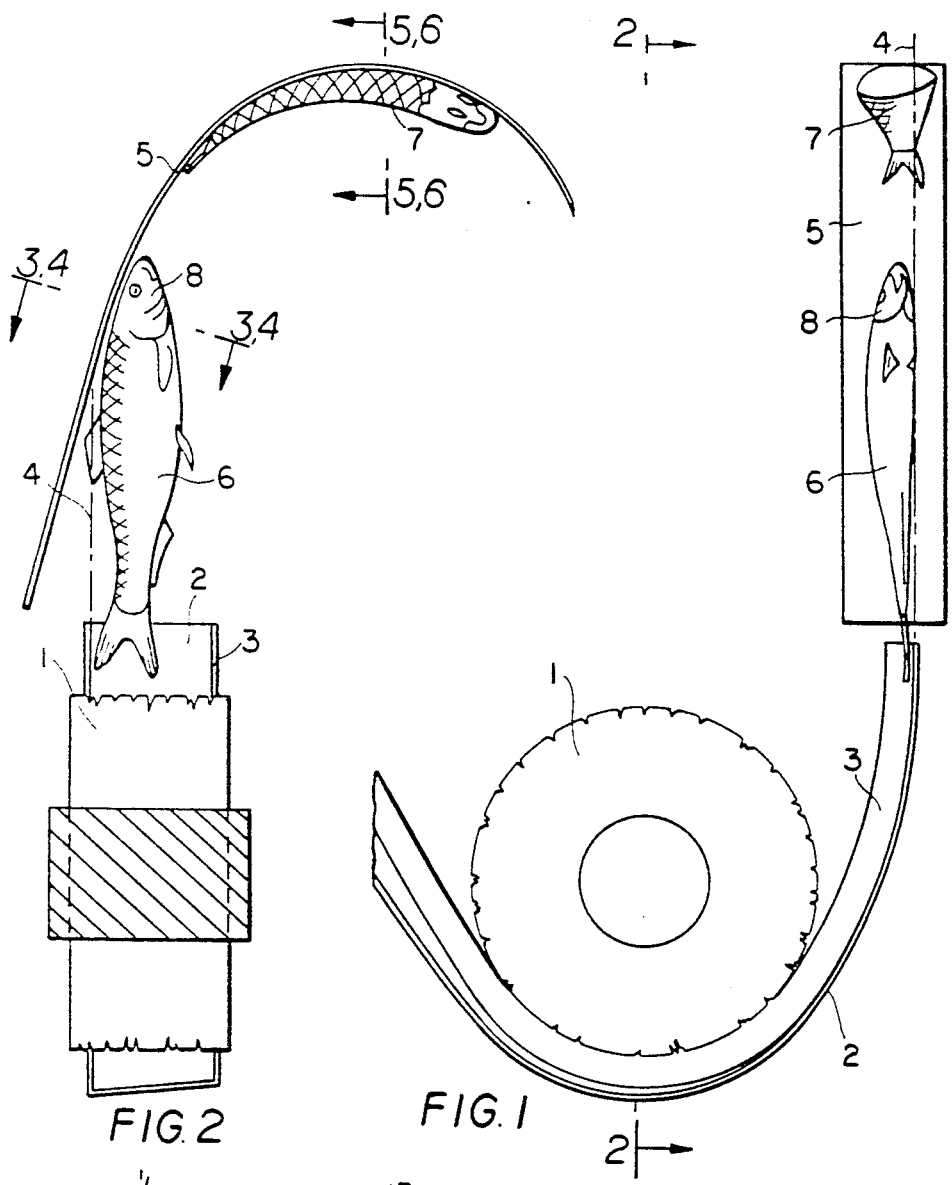

APPARATUS FOR ORIENTATION OF FISH WITH RESPECT TO THE POSITION OF ABDOMEN & DORSUM

The present invention relates to an apparatus for orientation of fish with respect to the position of abdomen and dorsum.

There exists a need for such an orientation in charging machines for fish. The U.S. Pat. No. 3,514,811 discloses an apparatus, the operation of which is based on the fact that the centre of gravity of the fish is situated closer to the dorsum and that the dorsum therefore tries to reach the deepest point of a V-shaped chute. Errors appear in the orientation, when the cross section of the fish is less distinctly triangular, especially at the abdominal section of the fish. Moreover, the chute shall be dimensioned considering the fish size in question.

The German Auslegeschrift 16 79 060, the Swedish Published Specifications 324 045 and 366 203 as well as the Finnish Patent Application 811370 disclose different embodiments of orientation apparatuses generally based on the principle that the fish is more or less squeezed at the dorsal and abdominal side, whereby the fish turns to a position desired. These apparatuses have the drawback that the fish gets easily damaged. Efforts have been made to solve this problem by arranging the elements squeezing the fish yieldingly resilient, mainly in the axial direction, to eliminate the restraining influence of the friction, or e.g. in the form of two rotary brushes, as shown in the Finnish Patent Application 811370. Hereby it is, however, necessary to adapt partly the space between the elements and partly the stiffness of the elements in proportion to the weight of the fish. Since automatic charging machines are mainly used in connection with smaller shoal fish, it shall be possible to adjust these machines for handling fish within the weight area of 10 to 500 g per fish, which means quite a number of different sets of brushes or similar elements.

The object of the present invention is to provide a new apparatus for orientation of fish with respect to the position of abdomen and dorsum, the outer dimensions of which apparatus are small and which is capable of handling fish of very varying sizes at high capacity.

The apparatus of the invention is mainly characterized in that it comprises a device for bringing the fish in motion head first at a speed desired and a guide element arranged at a distance after this device in the path of motion of the fish in such a way that the head of the fish hits the guide element obliquely both with respect to the direction of motion of the fish and also with respect to the middle plane of the fish head so that the centre of gravity of the fish head lies sidewards from the perpendicular to the guide element through the contact point of the fish, due to which the fish turns under the influence of its own mass into sideward contact with the guide element and into the same orientation with respect to the direction for abdomen and dorsum, irrespective of, whether the fish hits the guide element with dorsum or with abdomen.

The invention utilizes the fact that most fishes have a triangular cross section of head, the sides of the fish head forming the sides of an isosceles triangle, the base of which is formed by the neck of the fish, which neck is halved by the middle plane of the fish head. When the fish head hits the guide element at high speed, preferably in such a way that one side of the head forms an essentially right angle with the surface of the guide element, the fish rolls against the side where the centre of gravity is situated with respect to the perpendicular through the contact point on the surface of the guide element, on account of which the dorsum and the abdomen, respectively, always are directed to the same direction. It is enough that the head section of the fish is triangular, the rest of the body follows in the same direction, even though the cross section of the body is not triangular. At a change of direction, the normal force functioning through the mass of the fish generally is at least ten times the force of gravity, thanks to which the fish does not behave like a stiff fish, but the turning occurs instead rather like a wave through the fish at the point of contact. Consequently, the head section of the fish can be turned nearly 90°, while the tail section still maintains its original direction. The friction between the fish and the guide element can be considered as zero, because the friction in question is motion friction, the guide element can possibly be sprayed with water.

In a preferred embodiment of the invention, the device for bringing the fish in motion head first at a speed desired is an accelerator with a rotary brush or the like in connection with a curved guide element, the outlet guide surface of which forms an at least essentially right angle with the inlet guide surface of the guide element situated after the accelerator. The guide element arranged after the accelerator is preferably curved in a direction forming an at least essentially right angle with the outlet plane of the accelerator.

The apparatus according to the invention has following advantages:

Since the angle of impact and the radius of the curve can be adapted to the speed of the fish, the apparatus as such does not restrict the maximum possible speed, for which reason the capacity is high.

Since the fish is influenced by forces for the alignment and the maintainance of the position, which forces exceed many times the forces possibly working within the fish on account of death stiffness or low temperature, the difficulties with the alignment of fish stiffened for instance in a curve form are avoided.

Since these forces are distributed evenly on the fish without point load on vital parts, the apparatus handles the fish extremely gently.

Since the orientation is based only on the influence of the normal force on the fish, an adjustment of the apparatus with respect to the size of the fish is omitted within very great intervals.

Since the forces aiming at balance at the orientation of the fish are considerable and work without friction and from an exact starting position for each fish, the percentage of error is low, even in connection with fishes with a less distinctly triangular cross section of the head as well as of the body.

Since the angle of the curved guide element with the throw-out plane can at a given passage speed be compensated for the force of gravity, the apparatus can operate in any position, and since the apparatus preferably operates in an upright position, whereby the fish is transported upwards, constructional advantages are achieved for the unit, to which the apparatus belongs.

Since the fish is during the passage surrounded only by air at three sides, standstill and stoppage cannot appear during operation.

Since the fish falls off the guide element of itself in nearly all possible mounting positions of the apparatus, the apparatus is self-cleaning at accumulations possibly appearing at sudden (emergency) standstills, which often occur in processing machines of a certain kind.

Because the function of the apparatus of the invention is based on the motion energy stored in the fish, a relatively high passage speed is presupposed. A speed of 3 to 6 m/second is suitable in most cases. The apparatus can preferably be used for instance in an automatic charging machine with a fast operating synchronizing apparatus, e.g. according to the PCT Patent Application FI85/00026, but the apparatus can also be adapted to a slower fish flow if the curved guide element orientating the fish ends in a retardation brush. On account of the fast fish flow, a high handling capacity is also achieved with one orientation channel only; the small dimensions of the apparatus are advantageous especially on board a ship as well as often a precondition for that processing machines can be provided with automatic charging within the scope of an existing assembly plan.

The invention shall be described in more detail in the following referring to the drawing enclosed which, by way of example, shows a preferred embodiment.

FIG. 1 is a schematic side view of an embodiment of the apparatus.

FIG. 2 is a sectional view along the line A—A in FIG. 1.

FIGS. 3 and 4 are sectional views along the line B.B in FIG. 2 and show the two different situations when the fish hits the guide element with the dorsal side and the abdominal side, respectively.

FIGS. 5 and 6 are sectional views along the line C—C in FIG. 1 and show the final orientation of the fish after the contact of the dorsal side and the abdominal side, respectively, with the guide element.

Figure 7:
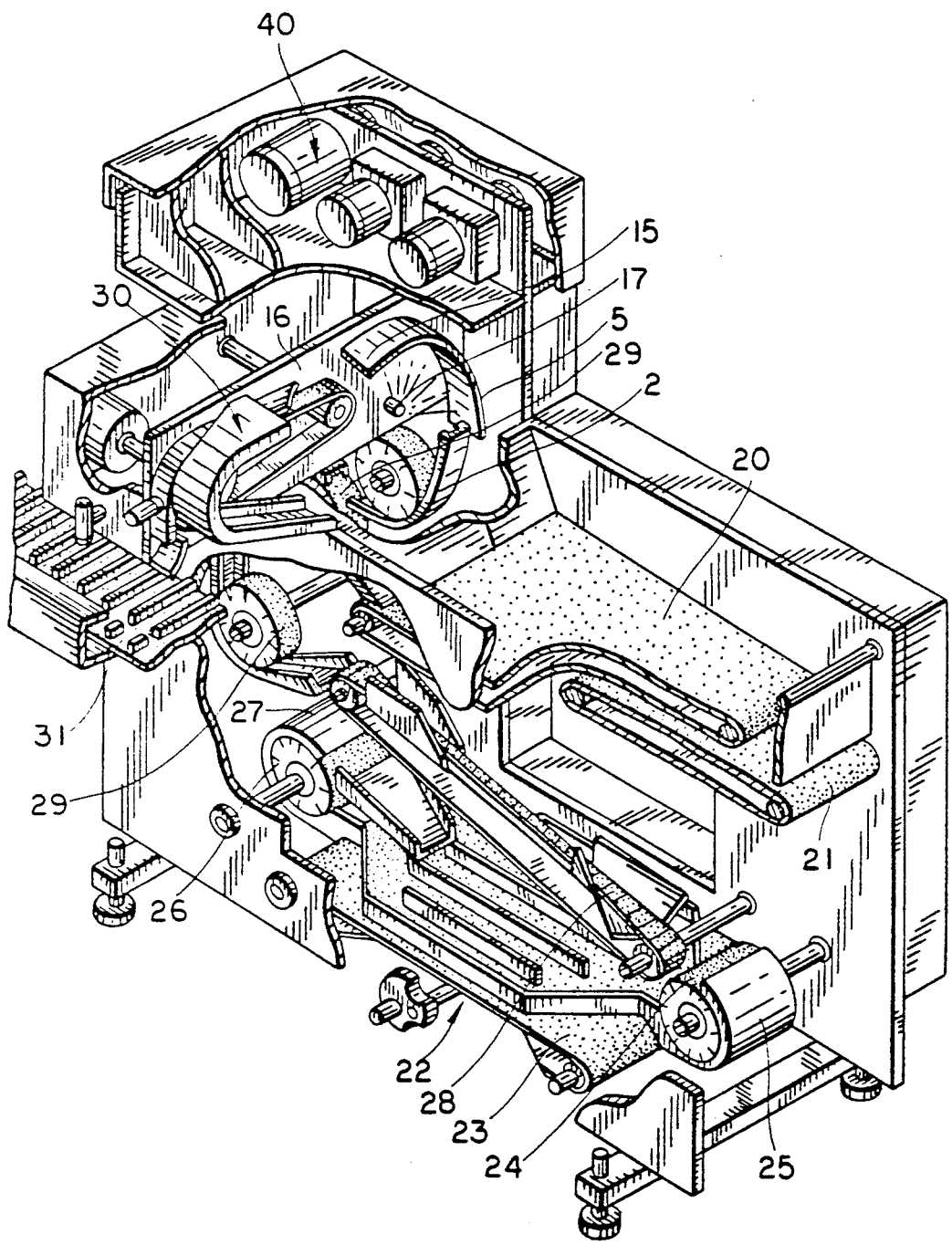
FIG. 7 shows an example of how the orientation apparatus of the invention can be arranged in a charging machine.

The reference numeral 1 in the drawing indicates a rotary brush and 2 a curved chute running along a section of the periphery of the brush 1. The numeral 3 indicates the edge of the chute. Fishes coming head first from the left in FIG. 1 are thrown out by the brush 1 from the end of the chute 2, to the right in FIG. 1, in a plane 4 coinciding with the direction of the bottom of the chute 2 at the outlet end and in FIG. 1 transversely to the direction plane. The reference numeral 5 indicates a guide element, against which the fishes 6 and 7 are thrown for the orientation with respect to the position of abdomen and dorsum in such a way that the dorsum of the fishes is turned to the left in FIG. 1 and the abdomen of the fishes to the right in the figure, irrespective of, whether the fishes hit the guide element 5 dorsum first, as the fish 6 in FIG. 1, or abdomen first. The head section of the fishes 6 hitting the guide element 5 in the FIGS. 1 and 2 is indicated by 8.

The chute 2 is at its inlet end preferably formed somewhat oblique to promote fishes of a smaller size to come to one side of the chute in order to achieve a starting position as homogeneous as possible before the contact with the guide element 5. The brush 1 or the like can be formed longer and conical, whereby the accelerator can by means of axial displacement be easily adapted to the capacity of the apparatus of handling fishes of varying size.

In the following, the motion of the fish from the so-called insert position shown by the fish 6 in the FIGS. 1 and 2 to the orientated position shown by the fish 7 is described more closely referring to the FIGS. 3 to 6.

The middle plane of the fish head 8 running through the centre of gravity of the head and halving the neck is indicated by means of the reference numeral 9. The sides of the head, i.e. the "cheeks", are indicated by 10 and 11. The perpendicular to the inlet guide surface 5a of the guide element 5 through the point of contact of the fish is indicated by 12 in FIG. 3 and by 13 in FIG. 4. Because the centre of gravity of the fish head 8 is situated to the right from the perpendicular 12 in FIG. 3 and to the left from the perpendicular 13 in FIG. 4, which is shown by means of the unnumbered force vectors of different sizes directed downwards through the centres of gravity of the fish head sections at respective sides of the perpendiculars 12 and 13, the fish head 8 will always be turned with the neck to the left after having hit the guide surface 5a, as is shown in the FIGS. 5 and 6. In the drawing, the levels 4 and 5a are perpendicular to each other, a certain deviation can be allowed, of course, for instance in order to compensate the force of gravity in connection with a horizontal embodiment or in order to facilitate (accelerate) the alignment from the usually less favourable dorsal position (FIG. 3), as long as the centre of gravity of the fish head 8 is situated at the right side of the perpendicular 12 and 13, respectively. The desired "straightening" of the fish in spite of possible death stiffness is achieved by letting the centrifugal force influence on the fish during its motion along the curved chute 2, thanks to which the fish is brought into an accurately defined starting position before the alignment. Thanks to the fact that also the guide element 5 is formed curved, preferably perpendicular to the throw-out level of the chute, the centrifugal force is utilized in order to guarantee that the alignment of the fish is maintained during further transportation.

FIG. 7 shows one possibility how to utilize the orientation apparatus of the invention in a charging machine. On the bottom of a buffer stock for fish there are two conveyor belts 20 and 21 feeding fish in dosages proportioned relatively roughly to an underlying device 22 for the orientation of the fish with respect to head and tail. A vibrating belt 23 with parallel chutes orientates the fish lengthwise, a part of the fish moves head first directly between a roll, or a brush 24 and a guide plate 25 to a conveyor belt 28, the rest of the fish passes at first between a roll 26 and a guide plate 27 and from there head first to the roll 24 and the guide plate 25.

After the conveyor 28 there are two further devices 29 comprising a roll and a guide plate, from which devices the fish is fed head first to the orientation apparatus of the invention. After the orientation element 5 there are devices for further transportation of the fish into a fish processing machine, for instance a filleting machine, at the same speed as the operating speed of the machine. The reference numeral 30 indicates a synchronizing device, 31 indicates a conveyor belt provided with receiving compartments and belonging to a fish processing machine, and the reference numeral 40 indicates a number of motors, for instance electric motors, used for the operation of the different parts of the machine. The devices 30 and 31 can operate in the manner described in the PCT Patent Application FI 85/00026.

The alignment of the fish in the feeding device 30 can be carried out for instance in such a way that the edge of the outlet end 15 of the orientation element 5 is bent downwards so that the fish slides into contact with the vertical support wall 16, which can be formed approximately curved to achieve the same effect alternatively, in the same way in principle as described above in connection with the brush 1 and the chute 2. The numeral 17 indicates a device for spraying water on the sliding surface of the orientation element 5.

The drawing shows a preferred embodiment of the invention, but its details can vary within the scope of the following claims, of course. Consequently, apparatuses of another kind for throwing the fish in alignment desired against the orientation element 5 are conceivable.

As mentioned above, the apparatus of the present invention, as it has been described up till now, essentially utilizes the fact that most shoal fishes relevant here have a more or less triangular cross section. To achieve the orientation desired, it is in most cases enough that only the head has a triangular cross section.

However, it can also occur that the heads of the fishes have been cut off in advance, or that a relatively big part of the fishes have got the head deformed or torn off when they were caught. If the body of the fish in such a case has a less distinctly triangular cross section, it can be appropriate to utilize some additional devices in order to guarantee that the centre of gravity of the part of the fish hitting the guide element 5 will lie at the right side of the perpendicular 12 through the point of contact on the guide element 5.

This can preferably be carried out in such a way that the guide element 5 is made in two subsequent parts, whereby the part hit by the fish 6 is caused to turn a little into a direction appropriate in each particular case. Another possibility is that the outlet end of the chute 2 is formed separately turnable to give the fish an initial turn when thrown. Further, it is possible to influence the fish during its flight between the chute 2 and the guide element 5, which can be done by means of water sprays or mechanical control means. In all these cases, the position of the fish with respect to abdomen and dorsum must be known, when the fish is in the throw-out chute 2, for which purpose optical detectors generally available on the market can be used. Necessary motions of the guide element 5 or the chute 2 etc. can be caused by means of servomechanisms, pneumatic cylinders or the like, also generally available. One skilled in the art has, in fact, no difficulties to carry out these arrangements, for which reason they are not shown in the drawing.

I claim:

1. An apparatus for orientation of fish with respect to the position of abdomen and dorsum, characterized in that it comprises a device (1, 2) for bringing the fish (6, 7) in motion head first at a speed desired and a guide element (5) arranged at a distance after this device (1, 2) in the path of motion of the fish in such a way that the head (8) of the fish (6) hits the guide element (5) obliquely both with respect to the direction of motion of the fish and also with respect to the middle plane (9) of the fish head (8) so that the centre of gravity of the head (8) of the fish (6) lies sidewards from the perpendicular (12, 13) to the guide element (5) through the contact point of the fish, due to which the fish turns under the influence of its own mass into sideward contact with the guide element (5) and into the same orientation with respect to the direction of abdomen and dorsum, irrespective of, whether the fish hits the guide element with dorsum or with abdomen.

2. An apparatus according to claim 1, characterized in that the device for bringing the fish in motion head first at a speed desired comprises a rotary brush (1) or the like in connection with a curved guide element (2) for throwing the fish in a direction desired.

3. An apparatus according to claim 1, characterized in that the guide element (5) situated after the device for bringing the fish in motion head first at a speed desired is arranged obliquely with respect to the middle plane (9) of the fish head so that one side (10, 11) of the head (8) of the fish (6) forms an at least essentially right angle with the guide element, when the head of the fish hits it.

4. An apparatus according to claim 2, characterized in that the outlet guide surface (4) of the guide element (2) included in the device for bringing the fish in motion head first at a speed desired forms an at least essentially right angle with the inlet guide surface (5a) of the guide element situated after the accelerator.

5. An apparatus according to claim 1, characterized in that the guide element (5) arranged after the device for bringing the fish in motion head first at a speed desired is curved in a direction at least essentially in a right angle with respect to the path of motion of the fish.

6. An apparatus according to claim 1, characterized in that the guide element (5) situated after the device for bringing the fish in motion head first at a speed desired has a support surface (16) on its one side, and that the guide element (5) towards its outlet end (15) forms a smaller angle than 90° with the support surface (16).

7. An apparatus according to claim 1, characterized in that it additionally comprises a detector arranged for the definition of the position of the fish with respect to abdomen and dorsum, preferably before the device (1, 2) for bringing the fish (6, 7) in motion head first at a speed desired and means for the provision of an initial turn desired in relation to the fish (6) and the orientation element (5).

* * * * *